US012763702B2

(12) United States Patent
Sneep

(10) Patent No.: US 12,763,702 B2
(45) Date of Patent: Oct. 13, 2026

(54) BRIDGE CONTROLLER WITH SLOPE DETECTOR

(71) Applicant: NXP USA, Inc., Austin, TX (US)

(72) Inventor: Jacobus Govert Sneep, Bavel (NL)

(73) Assignee: NXP USA, Inc., Austin, TX (US)

( * ) Notice: Subject to any disclaimer, the term of this patent is extended or adjusted under 35 U.S.C. 154(b) by 225 days.

(21) Appl. No.: 18/616,851

(22) Filed: Mar. 26, 2024

(65) Prior Publication Data

US 2025/0309787 A1 Oct. 2, 2025

(51) Int. Cl.

| | |
|---|---|
| ***H02M 7/538*** | (2007.01) |
| ***H02M 1/38*** | (2007.01) |
| ***H02M 7/46*** | (2006.01) |
| ***H02M 7/5387*** | (2007.01) |

(52) U.S. Cl.

CPC ......... *H02M 7/53871* (2013.01); *H02M 7/46* (2013.01)

(58) Field of Classification Search

CPC .. H02M 7/125; H02M 7/219; H02M 7/53871; H02M 7/46; H02M 1/38

See application file for complete search history.

(56) References Cited

U.S. PATENT DOCUMENTS 7,411,768 B2 8/2008 Sells
7,787,271 B2 8/2010 Popescu et al.
2010/0165686 A1* 7/2010 Matzberger ........... H02M 7/219 363/127
2013/0215657 A1 8/2013 Heath et al.
2015/0117076 A1* 4/2015 Zhang .................. H02M 7/219 363/127
2015/0263511 A1 9/2015 Sandner et al.
2016/0336871 A1* 11/2016 Aungurencei ........ H02M 7/217
2016/0344302 A1* 11/2016 Inoue .................... H02M 7/219
2023/0216425 A1* 7/2023 Yang ..................... H02M 7/219 363/89

OTHER PUBLICATIONS

NXP; "TEA2206T—Active bridge rectifier controller—Rev. 1.1—Apr. 14, 2021—Product data sheet"; Apr. 14, 2021; 15 pages.
NXP; "TEA2208T—Active bridge rectifier controller—Rev. 1.4—Apr. 14, 2021—Product data sheet"; Apr. 14, 2021; 19 pages.
NXP; "TEA2209T—Active bridge rectifier controller—Rev. 1.1—Apr. 14, 2021—Product data sheet"; Apr. 14, 2021; 20 pages.
Wikipedia; "Bridge circuit"; Retrieved from internet https://en.wikipedia.org/wiki/Bridge_circuit on Mar. 22, 2024; 3 pages.

* cited by examiner

*Primary Examiner* — Sisay G Tiku

(57) ABSTRACT

One example discloses a bridge controller, including: a slope detector coupled between the first input node and the second output node; wherein the slope detector is configured to measure a rate of change of an input voltage across the first input node and the second input node; and wherein the bridge controller is configured to blank at least one of the first switch and the second switch if the measured rate of change exceeds a predetermined value.

19 Claims, 8 Drawing Sheets

BRIDGE CONTROLLER WITH SLOPE DETECTOR

The present specification relates to systems, methods, apparatuses, devices, articles of manufacture and instructions for bridge controllers.

SUMMARY

According to an example embodiment, a bridge controller, comprising: wherein the bridge controller is configured to be coupled to a bridge circuit; wherein the bridge circuit includes, a first pair of diodes coupled in series; a second pair of diodes coupled in series; wherein the first pair of diodes is coupled in parallel with the second pair of diodes between a first output node and a second output node; a first input node coupled between the first pair of diodes; a second input node coupled between the second pair of diodes; a first switch coupled in parallel with one of the first pair of diodes; a second switch coupled in parallel with one of the second pair of diodes; wherein the bridge controller is coupled the first input node, the second input node, the first switch and the second switch; wherein the bridge controller includes a slope detector coupled between the first input node and the second output node; wherein the slope detector is configured to measure a rate of change of an input voltage across the first input node and the second input node; and wherein the bridge controller is configured to blank at least one of the first switch and the second switch if the measured rate of change exceeds a predetermined value.

In another example embodiment, the bridge circuit is a rectifier circuit.

In another example embodiment, the bridge circuit is either a voltage rectifier, or a current rectifier.

In another example embodiment, the switches are MOSFET devices and the controller is coupled to each gate of the MOSFET devices.

In another example embodiment, the slope detector is configured to measure a first derivative of the input voltage across the first input node and the second input node.

In another example embodiment, the bridge controller is configured to blank both the first switch and the second switch if the measured rate of change exceeds the predetermined value.

In another example embodiment, the bridge controller includes a NOR gate coupled between the slope detector and at least one of the first switch and the second switch.

In another example embodiment, the NOR gate is configured to blank at least one of the first switch and the second switch if the measured rate of change exceeds the predetermined value.

In another example embodiment, the slope detector is a first slope detector; and the controller includes a second slope detector coupled between the second input node and the second output node.

In another example embodiment, the first slope detector is configured to measure a first rate of change of the input voltage across the first input node and the second input node; and the second slope detector is configured to measure a second rate of change of the input voltage across the first input node and the second input node.

In another example embodiment, the bridge controller is configured to blank at least one of the first switch and the second switch if at least one of the first measured rate of change exceeds a first predetermined value and the second measured rate of change exceeds a second predetermined value.

In another example embodiment, the bridge controller is configured to blank at least one of the first switch and the second switch only if both the first measured rate of change exceeds the first predetermined value and the second measured rate of change exceeds the second predetermined value.

In another example embodiment, the bridge controller includes a first NOR gate coupled between the first slope detector and the first switch and includes a second NOR gate coupled between the second slope detector the second switch.

In another example embodiment, the first NOR gate is configured to blank the first switch if the first measured rate of change exceeds the first predetermined value; and the second NOR gate is configured to blank the second switch if the second measured rate of change exceeds the second predetermined value.

In another example embodiment, a third switch coupled in parallel with another one of the first pair of diodes; a fourth switch coupled in parallel with another one of the second pair of diodes; wherein the bridge controller is coupled to the third switch and the fourth switch; and wherein the bridge controller is configured to blank at least one of the first, second, third and fourth switch if the measured rate of change exceeds the predetermined value.

In another example embodiment, the second output node is a ground reference node.

In another example embodiment, the second output node is a voltage supply node.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
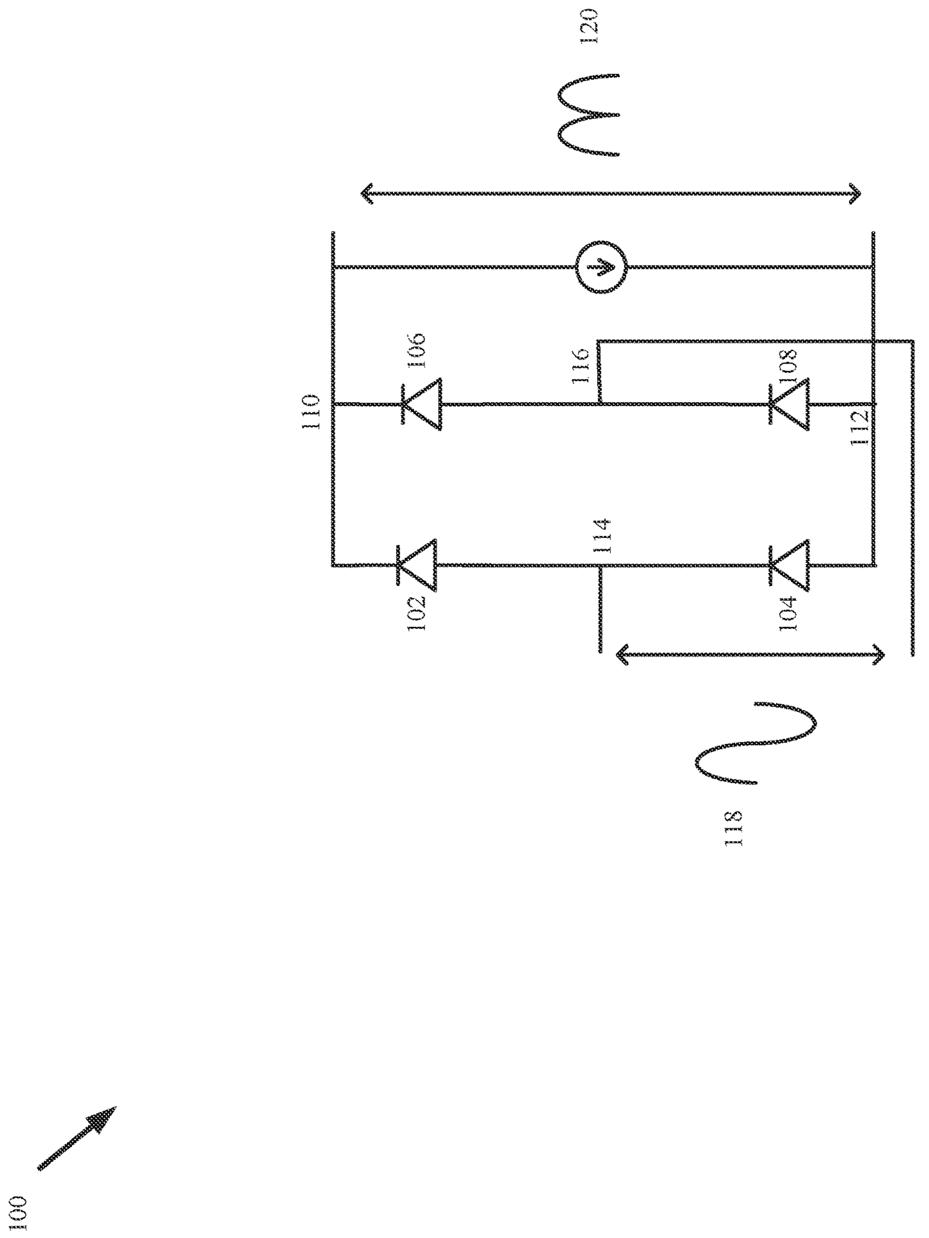
FIG. 1 represents an example of a passive voltage rectifier.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

FIG. 1 represents an example of a passive voltage rectifier 100 (e.g. standard diode bridge). The passive voltage rectifier 100 includes a first pair of diodes 102, 104, a second pair of diodes 106, 108, a first output node 110, a second output node 112, a first input node 114, and a second input node 116.

The first pair of diodes 102, 104 are coupled in series. The second pair of diodes 106, 108 are also coupled in series. The first pair of diodes 102, 104 are coupled in parallel with the second pair of diodes 106, 108 between the first output node 110 and the second output node 112. The first input node 114 is coupled between the first pair of diodes 102, 104, and the second input node 116 is coupled between the second pair of diodes 106, 108.

In this configuration, an input voltage 118 across the input nodes 114, 116 is electrically transformed into a rectified output voltage 120 across the output nodes 110, 112.

Figure 2A:
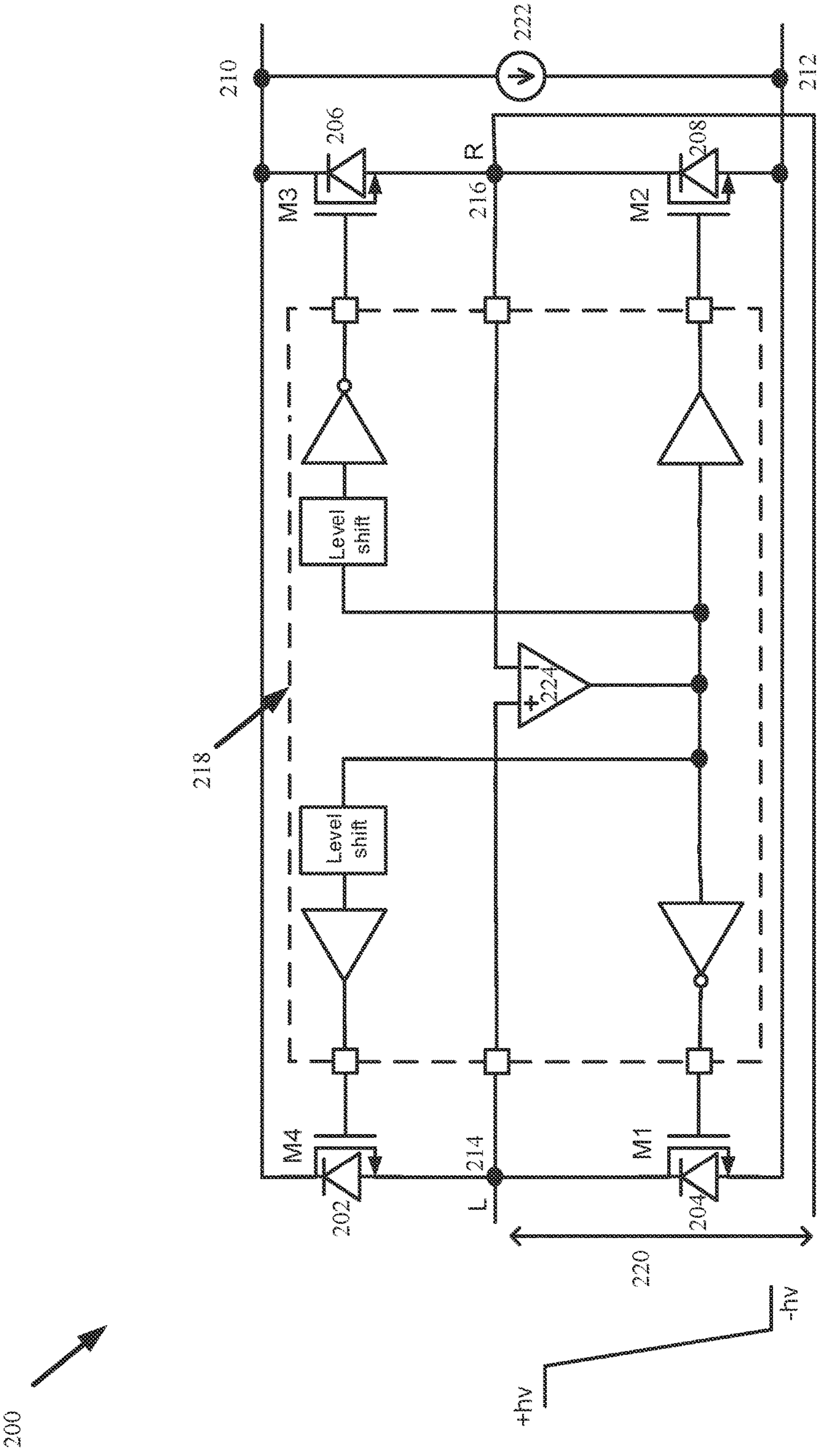
FIGS. 2A, 2B, 2C represent an example of a first active voltage rectifier.
Figure 2B:
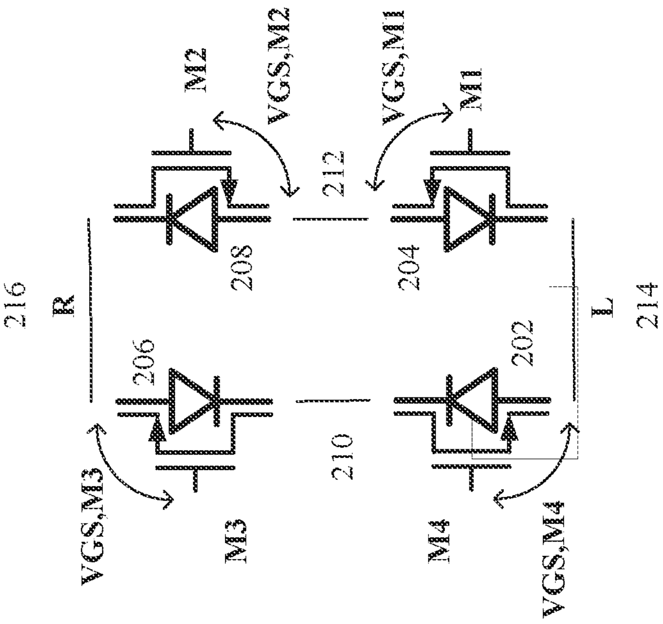
Figure 2C:
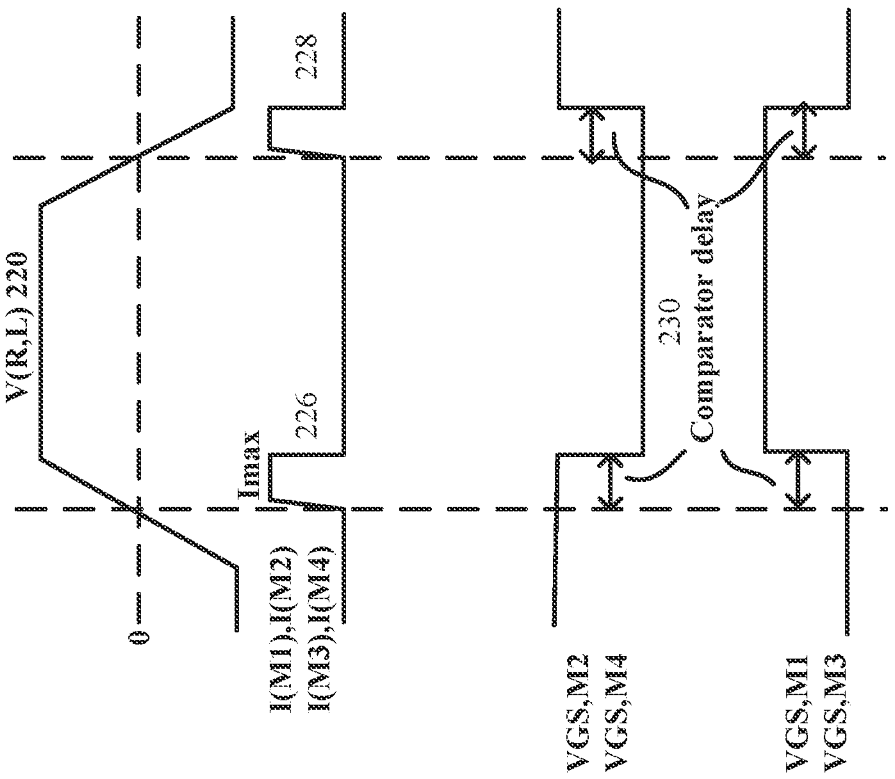

FIGS. 2A, 2B, 2C represent an example of a first active voltage rectifier 200 (e.g. active diode bridge). The first active voltage rectifier 200 includes a first pair of diodes 202, 204, a second pair of diodes 206, 208, a first output node 210, a second output node 212, a first input node 214, a second input node 216, switch M1, switch M2, switch M3, switch M4, and a bridge controller 218.

The first pair of diodes 202, 204 are coupled in series. The second pair of diodes 206, 208 are also coupled in series. The first pair of diodes 202, 204 are coupled in parallel with the second pair of diodes 206, 208 between the first output node 210 and the second output node 212. The first input node 214 is coupled between the first pair of diodes 202, 204, and the second input node 216 is coupled between the second pair of diodes 206, 208.

Switch M4 is coupled in parallel with diode 202, Switch M1 is coupled in parallel with diode 204, Switch M3 is coupled in parallel with diode 206, and Switch M2 is coupled in parallel with diode 208.

The bridge controller 218 is coupled to the first input node 214, the second input node 216, and the switches M1, M2, M3, M4.

An input voltage 220 across the input nodes 214, 216 is electrically transformed into a rectified output voltage 222 across the output nodes 210, 212.

The active voltage rectifier 200 configuration is used to reduce power consumption as compared to the passive voltage rectifier 100 discussed in FIG. 1 found in power supplies. By using the PowerFETs (e.g. MOSFETs) as switches M1, M2, M3, M4, a forward voltage drop of the diodes 202, 204, 206, 208 is reduced.

The bridge controller 218 includes a comparator 224, level shifters (as shown), and a set of logic (as shown) (e.g. delay buffers and logical NOT buffers). The switches M1, M2, M3, M4 are controlled by the comparator 224 which monitors a polarity of the input voltage 220.

While the input voltage 220 for normal mains applications is usually a low-frequency sinewave; however, disturbances to the input voltage 220, perhaps due to arcing, lightning, transients, or other ESD (electrostatic discharge) events may present large current spikes 226, 228 at one or more of the switches M1, M2, M3, M4 gates as shown in FIG. 2C. These large current spikes 226, 228 in turn may cause high currents to flow in the diodes 202, 204, 206, 208 as shown in FIG. 2B due to these diodes 202, 204, 206, 208 being bypassed by the switches M1, M2, M3, M4 at a wrong time in the input voltage 220 cycle.

For example, during a comparator delay 230 after a first zero-crossing transistors M2 and M4 are in on-state at high Vds (drain-source voltage), which causes a high current (Imax) to flow 226, 228. Such high current may also damage the switches M1, M2, M3, M4. Transistors M1 and M3 suffer from a same high current risk, however, for these transistors the large current spikes 226, 228 will flow through their body diodes which is less of a problem.

While, reducing the comparator delay 230 might reduce a duration of the large current spikes 226, 228, they will not be eliminated.

Now discussed are example embodiments of active bridge circuits that, in some example embodiments, include an input voltage slope detector which prevents large current spikes at each diode's switch, due to high input voltage jumps due to arcing, lightning, transients, or other ESD (electrostatic discharge) events. These example embodiments prevent/minimize cross-conduction of the diode bypass switches.

The slope detector is configured to detect the input voltage jumps and in response turn-off one or more portions of the active bridge circuit to prevent any risk of cross-conduction. Note that the to be discussed input voltage slope detector is different from an input voltage detector, at least since the input voltage slope is a first derivative of the input voltage.

Figure 3A:
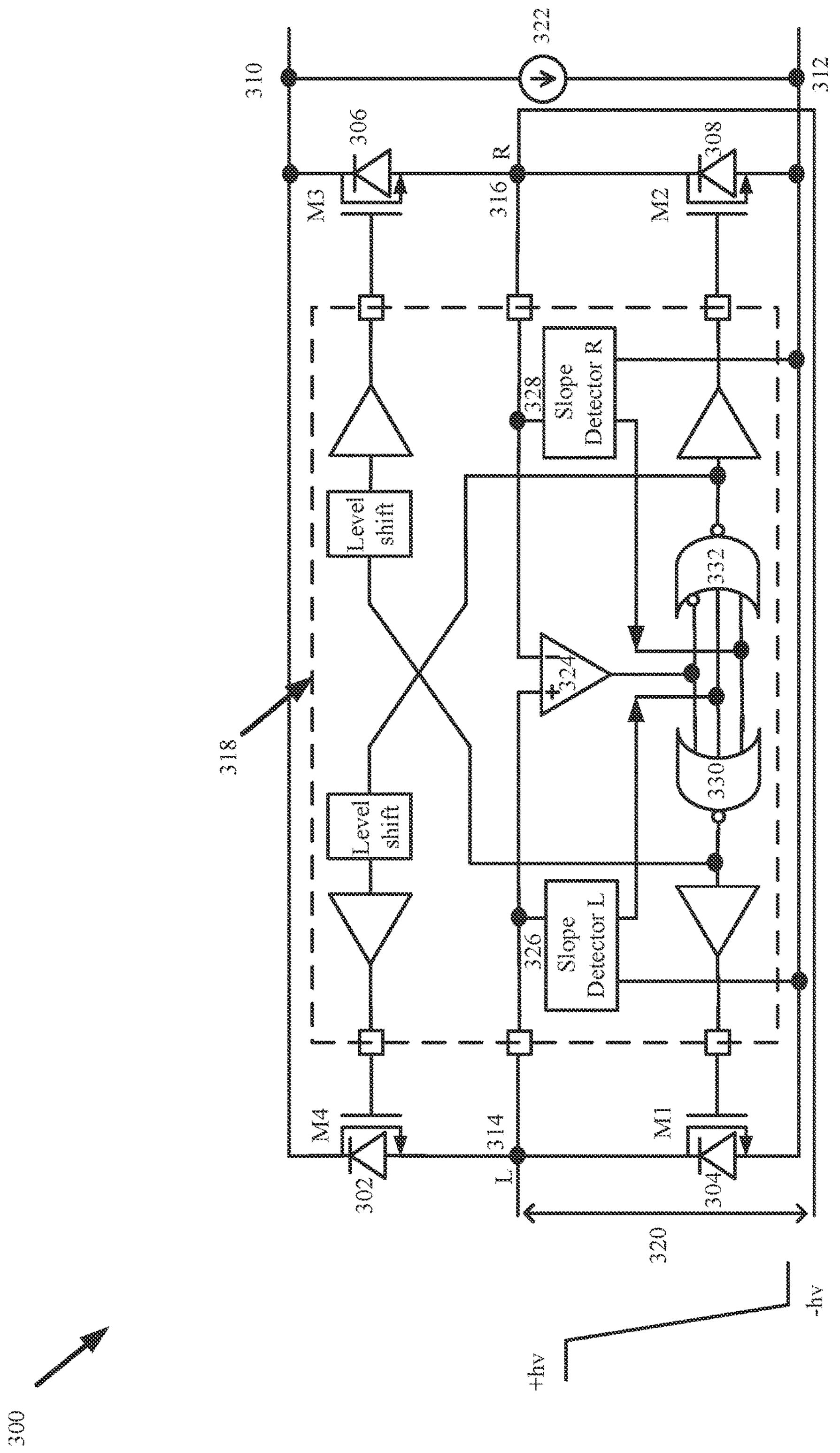
FIGS. 3A, 3B, 3C represent an example of a second active voltage rectifier.
Figure 3B:
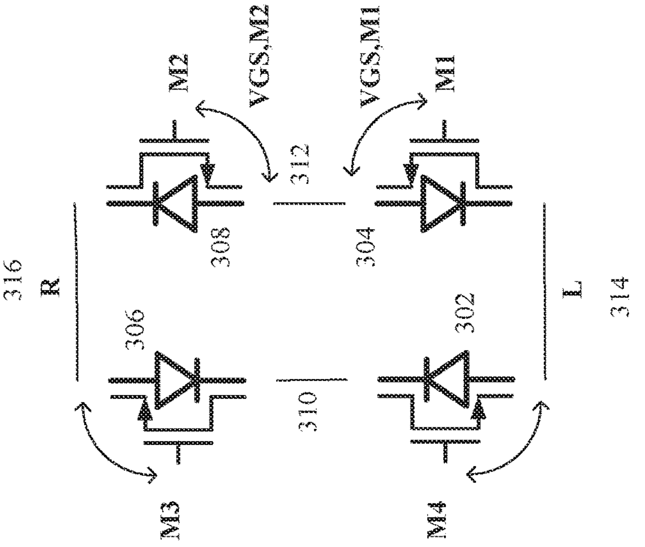
Figure 3C:
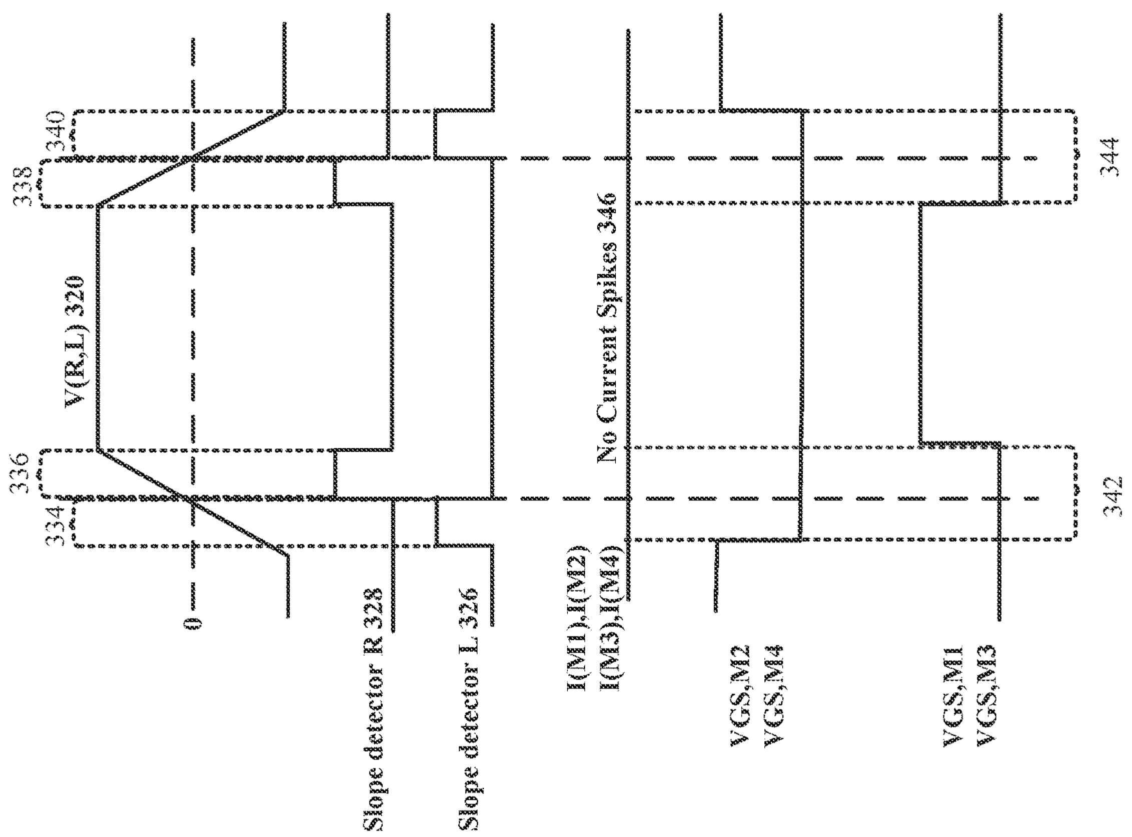

FIGS. 3A, 3B, 3C represent an example of a second active voltage rectifier 300. The second active voltage rectifier 300 includes a first pair of diodes 302, 304, a second pair of diodes 306, 308, a first output node 310, a second output node 312, a first input node 314, a second input node 316, switch M1, switch M2, switch M3, switch M4, and a bridge controller 318.

The first pair of diodes 302, 304 are coupled in series. The second pair of diodes 306, 308 are also coupled in series. The first pair of diodes 302, 304 are coupled in parallel with the second pair of diodes 306, 308 between the first output node 310 and the second output node 312. The first input node 314 is coupled between the first pair of diodes 302, 304, and the second input node 316 is coupled between the second pair of diodes 306, 308.

Switch M4 is coupled in parallel with diode 302, Switch M1 is coupled in parallel with diode 304, Switch M3 is coupled in parallel with diode 306, and Switch M2 is coupled in parallel with diode 308.

The bridge controller 318 is coupled to the first input node 314, the second input node 316, and the switches M1, M2, M3, M4.

An input voltage 320 across the input nodes 314, 316 is electrically transformed into a rectified output voltage 322 across the output nodes 310, 312.

The bridge controller 318 includes a comparator 324, level shifters (as shown), a set of logic (as shown) (e.g. delay buffers and logical NOT buffers), a first slope detector (L) 326, a second slope detector (R) 328, a first NOR gate 330, and a second NOR gate 332. The switches M1, M2, M3, M4 are controlled by the comparator 324 which monitors a polarity of the input voltage 320.

As mentioned earlier, the input voltage 320 for normal mains applications is usually a low-frequency sinewave; however, disturbances to the input voltage 320, perhaps due to arcing, lightning, transients, or other ESD (electrostatic discharge) events may present large current spikes at one or more of the switches M1, M2, M3, M4 gates.

The slope detectors 326, 328 and the NOR gates 330, 332, however, prevent such large current spikes by blanking one or more of the switches M1, M2, M3, M4 gate signals from the bridge controller 318, such as shown in FIGS. 3B and 3C.

The first slope detector (L) 326 measures a slope of a first portion 334 of the input voltage 320. If the slope of the first portion 334 exceeds a predetermined rate of change (e.g. slope) then the first slope detector (L) 326 sends a signal to the NOR gates 330, 332 which blanks a gate signal to switches M1 and M2 as shown by the first blanking interval

342. Note that in other example embodiments, any of the switches M1, M2, M3, M4 may either be individually or concurrently blanked, depending upon how the bridge controller 318 is embedded in a bridge circuit and/or other circuit.

Similarly, the second slope detector (R) 328 measures a slope of a second portion 336 of the input voltage 320. If the slope of the second portion 336 exceeds a predetermined rate of change (e.g. slope) then the second slope detector (R) 328 sends a signal to the NOR gates 330, 332 which again blanks a gate signal to switches M1 and M2 as shown by the first blanking interval 342. As mentioned above, in other example embodiments, any of the switches M1, M2, M3, M4 may either be individually or concurrently blanked, depending upon how the bridge controller 318 is embedded in a bridge circuit and/or other circuit.

The first slope detector (L) 326, the second slope detector (R) 328, the first NOR gate 330, and the second NOR gate 332 function in a similar manner for a slope of a third portion 338 of the input voltage 320 and a slope of a fourth portion 340 of the input voltage 320, thereby creating a second blanking interval 344.

As a result, there are no current spikes 346 presented to the switches M1, M2, M3, M4 during either a positive or negative slope of the input voltage 320 that exceeds a predetermined rate of change (i.e. slope, first differential, etc.). In some example embodiments, the slope detectors 326, 328 only output a signal to the NOR gates 330, 332 when the input voltage 320 slope exceeds 10 V/μsec.

Figure 4:
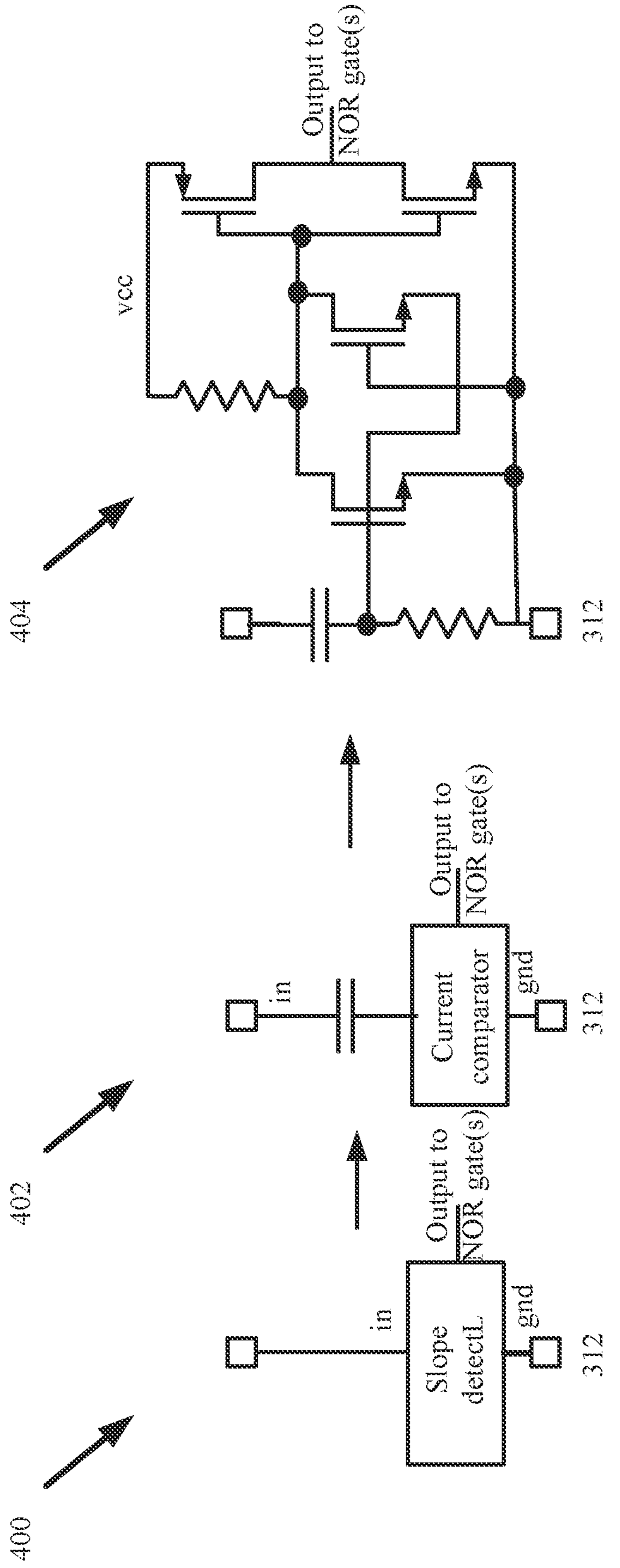
FIG. 4 represents three example embodiments of a slope detector.

FIG. 4 represents three example embodiments 400, 402, 404 of a slope detector. The first example embodiment 400 is as shown in FIG. 3A. The second example embodiment 402, can replace example 400 in FIG. 3A and includes a capacitor. The third example embodiment 404, also can replace example 400 in FIG. 3A and includes other circuit elements (as shown).

Figure 5A:
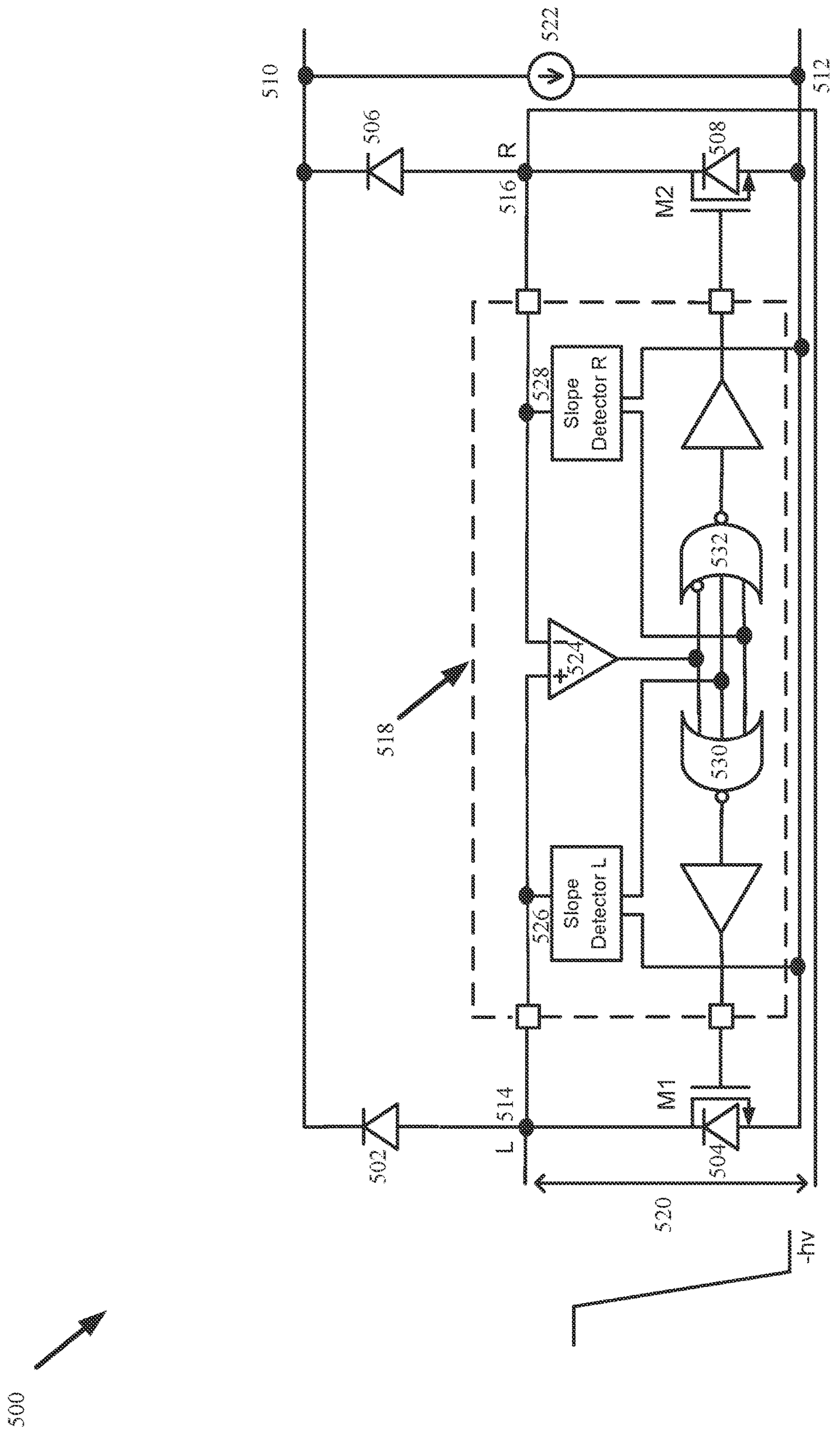
FIGS. 5A, 5B, 5C represent an example of a third active voltage rectifier.
Figure 5C:
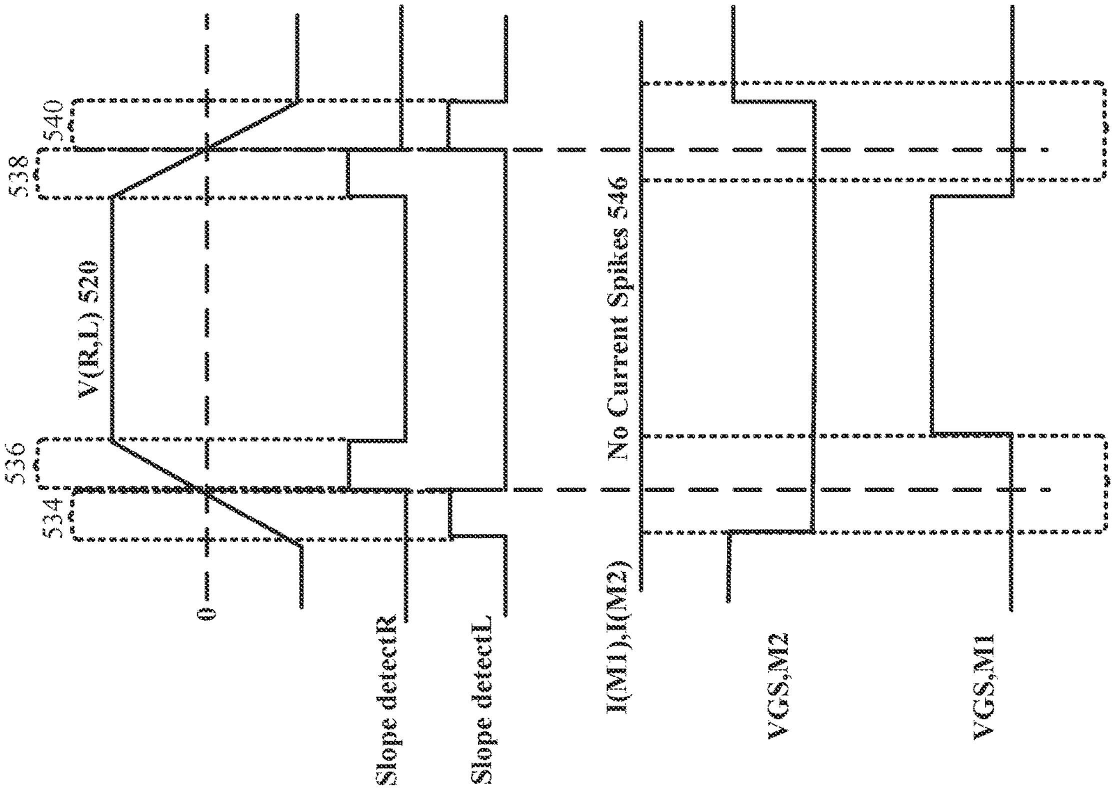
Figure 5B:
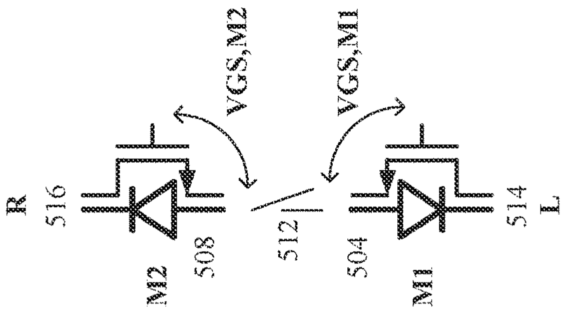

FIGS. 5A, 5B, 5C represent an example of a third active voltage rectifier 500. The second active voltage rectifier 500 includes a first pair of diodes 502, 504, a second pair of diodes 506, 508, a first output node 510, a second output node 512, a first input node 514, a second input node 516, switch M1, switch M2, and a bridge controller 518.

The first pair of diodes 502, 504 are coupled in series. The second pair of diodes 506, 508 are also coupled in series. The first pair of diodes 502, 504 are coupled in parallel with the second pair of diodes 506, 508 between the first output node 510 and the second output node 512. The first input node 514 is coupled between the first pair of diodes 502, 504, and the second input node 516 is coupled between the second pair of diodes 506, 508.

Switch M1 is coupled in parallel with diode 504, and Switch M2 is coupled in parallel with diode 508. The bridge controller 518 is coupled to the first input node 514, the second input node 516, and the switches M1, M2.

An input voltage 520 across the input nodes 514, 516 is electrically transformed into a rectified output voltage 522 across the output nodes 510, 512.

The bridge controller 518 includes a comparator 524, a set of logic (as shown) (e.g. delay buffers), a first slope detector (L) 526, a second slope detector (R) 528, a first NOR gate 530, and a second NOR gate 532. The switches M1, M2 are controlled by the comparator 524 which monitors a polarity of the input voltage 520.

Similar to as discussed in FIGS. 3A, 3B, 3C, the slope detectors 526, 528 and the NOR gates 530, 532, prevent large current spikes by blanking one or more of the switches M1, M2 gate signals from the bridge controller 518, such as shown in FIGS. 5B and 5C.

The first slope detector (L) 526 measures a slope of a first portion 534 of the input voltage 520. If the slope of the first portion 534 exceeds a predetermined rate of change (e.g. slope) then the first slope detector (L) 526 sends a signal to the NOR gates 530, 532 which blanks a gate signal to switches M1 and M2 as shown by the first blanking interval 542. Note that in other example embodiments, any of the switches M1, M2 may either be individually or concurrently blanked, depending upon how the bridge controller 518 is embedded in a bridge circuit and/or other circuit.

Similarly, the second slope detector (R) 528 measures a slope of a second portion 536 of the input voltage 520. If the slope of the second portion 536 exceeds a predetermined rate of change (e.g. slope) then the second slope detector (R) 528 sends a signal to the NOR gates 530, 532 which again blanks a gate signal to switches M1 and M2 as shown by the first blanking interval 542. As mentioned above, in other example embodiments, any of the switches M1, M2 may either be individually or concurrently blanked, depending upon how the bridge controller 518 is embedded in a bridge circuit and/or other circuit.

The first slope detector (L) 526, the second slope detector (R) 528, the first NOR gate 530, and the second NOR gate 532 function in a similar manner for a slope of a third portion 538 of the input voltage 520 and a slope of a fourth portion 540 of the input voltage 520, thereby creating a second blanking interval 544.

As a result, there are no current spikes 546 presented to the switches M1, M2 during either a positive or negative slope of the input voltage 520 that exceeds a predetermined rate of change (i.e. slope, first differential, etc.).

Any instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A bridge controller, comprising:

wherein the bridge controller is configured to be coupled to a bridge circuit;

wherein the bridge circuit includes, a first pair of diodes coupled in series;

a second pair of diodes coupled in series;

wherein the first pair of diodes is coupled in parallel with the second pair of diodes between a first output node and a second output node;

a first input node coupled between the first pair of diodes;

a second input node coupled between the second pair of diodes;

a first switch coupled in parallel with one of the first pair of diodes;

a second switch coupled in parallel with one of the second pair of diodes;

wherein the bridge controller is coupled to the first input node, the second input node, the first switch and the second switch;

wherein the bridge controller includes a slope detector coupled between the first input node and the second output node;

wherein the slope detector is configured to measure a rate of change of an input voltage across the first input node and the second input node; and wherein the bridge controller is configured to blank at least one of the first switch and the second switch if the measured rate of change exceeds a predetermined value.

2. The bridge controller of claim 1:

wherein the bridge circuit is a rectifier circuit.

3. The bridge controller of claim 1:

wherein the bridge circuit is either a voltage rectifier, or a current rectifier.

4. The bridge controller of claim 1:

wherein the first and second switches are MOSFET devices and the controller is coupled to each gate of the MOSFET devices.

5. The bridge controller of claim 1:

wherein the slope detector is configured to measure a first derivative of the input voltage across the first input node and the second input node.

6. The bridge controller of claim 1:

wherein the bridge controller is configured to blank both the first switch and the second switch if the measured rate of change exceeds the predetermined value.

7. The bridge controller of claim 1:

wherein the bridge controller includes a NOR gate coupled between the slope detector and at least one of the first switch and the second switch.

8. The bridge controller of claim 7:

wherein the NOR gate is configured to blank at least one of the first switch and the second switch if the measured rate of change exceeds the predetermined value.

9. The bridge controller of claim 1:

wherein the slope detector is a first slope detector; and wherein the controller includes a second slope detector coupled between the second input node and the second output node.

10. The bridge controller of claim 9:

wherein the first slope detector is configured to measure a first rate of change of the input voltage across the first input node and the second input node; and wherein the second slope detector is configured to measure a second rate of change of the input voltage across the first input node and the second input node.

11. The bridge controller of claim 10:

wherein the bridge controller is configured to blank at least one of the first switch and the second switch if at least one of the first measured rate of change exceeds a first predetermined value and the second measured rate of change exceeds a second predetermined value.

12. The bridge controller of claim 10:

wherein the bridge controller is configured to blank at least one of the first switch and the second switch only if both the first measured rate of change exceeds the first predetermined value and the second measured rate of change exceeds the second predetermined value.

13. The bridge controller of claim 10:

wherein the bridge controller includes a first NOR gate coupled between the first slope detector and the first switch and includes a second NOR gate coupled between the second slope detector the second switch.

14. The bridge controller of claim 13:

wherein the first NOR gate is configured to blank the first switch if the first measured rate of change exceeds the first predetermined value; and wherein the second NOR gate is configured to blank the second switch if the second measured rate of change exceeds the second predetermined value.

15. The bridge controller of claim 1, further comprising:

a third switch coupled in parallel with another one of the first pair of diodes;

a fourth switch coupled in parallel with another one of the second pair of diodes;

wherein the bridge controller is coupled to the third switch and the fourth switch; and wherein the bridge controller is configured to blank at least one of the first, second, third and fourth switch if the measured rate of change exceeds the predetermined value.

16. The bridge controller of claim 1:

wherein the second output node is a ground reference node.

17. The bridge controller of claim 1:

wherein the second output node is a voltage supply node.

18. A bridge controller, comprising:

wherein the bridge controller is configured to be coupled to a bridge circuit;

wherein the bridge circuit includes, a first pair of diodes coupled in series;

a second pair of diodes coupled in series;

wherein the first pair of diodes is coupled in parallel with the second pair of diodes between a first output node and a second output node;

a first input node coupled between the first pair of diodes;

a second input node coupled between the second pair of diodes;

a first switch coupled in parallel with one of the first pair of diodes;

a second switch coupled in parallel with one of the second pair of diodes;

wherein the bridge controller is coupled to the first input node, the second input node, the first switch and the second switch;

wherein the bridge controller includes a slope detector coupled between the first input node and the second output node;

wherein the slope detector is configured to measure a rate of change of an input voltage across the first input node and the second input node;

wherein the bridge controller is configured to blank at least one of the first switch and the second switch if the measured rate of change exceeds a predetermined value; and wherein the bridge controller includes a NOR gate coupled between the slope detector and at least one of the first switch and the second switch.

19. A bridge controller, comprising:

wherein the bridge controller is configured to be coupled to a bridge circuit;

wherein the bridge circuit includes, a first pair of diodes coupled in series;

a second pair of diodes coupled in series;

wherein the first pair of diodes is coupled in parallel with the second pair of diodes between a first output node and a second output node;

a first input node coupled between the first pair of diodes;

a second input node coupled between the second pair of diodes;

a first switch coupled in parallel with one of the first pair of diodes;

a second switch coupled in parallel with one of the second pair of diodes;

wherein the bridge controller is coupled to the first input node, the second input node, the first switch and the second switch;

wherein the bridge controller includes a slope detector coupled between the first input node and the second output node;

wherein the slope detector is configured to measure a rate of change of an input voltage across the first input node and the second input node;

wherein the bridge controller is configured to blank at least one of the first switch and the second switch if the measured rate of change exceeds a predetermined value;

wherein the slope detector is a first slope detector;

wherein the controller includes a second slope detector coupled between the second input node and the second output node;

wherein the first slope detector is configured to measure a first rate of change of the input voltage across the first input node and the second input node; and wherein the second slope detector is configured to measure a second rate of change of the input voltage across the first input node and the second input node.

* * * * *